United States Patent
Kato et al.

(10) Patent No.: US 6,627,838 B2
(45) Date of Patent: Sep. 30, 2003

(54) SMALL HOLE ELECTRIC DISCHARGE MACHINE

(75) Inventors: Kazuo Kato, Fukui (JP); Yoshihiro Kurosaka, Fukui (JP); Yuzo Dohi, Suzhou (CN)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 10/061,361

(22) Filed: Feb. 4, 2002

(65) Prior Publication Data

US 2002/0125217 A1 Sep. 12, 2002

(30) Foreign Application Priority Data

Feb. 5, 2001 (JP) ........................................ 2001-028861

(51) Int. Cl.[7] ................ B23H 1/00; B23H 7/30
(52) U.S. Cl. ................................................ 219/69.2
(58) Field of Search ........................ 219/69.2, 69.14, 219/69.15

(56) References Cited

U.S. PATENT DOCUMENTS

| | | | | |
|---|---|---|---|---|
| 3,725,631 A | * | 4/1973 | Angelucci et al. | 219/69.2 |
| 4,393,292 A | | 7/1983 | Inoue | 219/69.2 |
| 4,705,932 A | | 11/1987 | Aso et al. | 219/69.2 |
| 5,281,788 A | | 1/1994 | Abiko et al. | 219/69.14 |
| 6,459,063 B1 | * | 10/2002 | Okazaki et al. | 219/69.2 |
| 6,538,227 B1 | * | 3/2003 | Sano et al. | 219/69.2 |

FOREIGN PATENT DOCUMENTS

| | | | |
|---|---|---|---|
| JP | 63-200904 | 8/1988 | |
| JP | 5-104332 | 4/1993 | 219/69.16 |
| JP | 8-309620 | 11/1996 | |
| JP | 2000-153412 A | * 6/2000 | |
| JP | 2000-225526 A | * 8/2000 | |
| JP | 2000-225527 A | * 8/2000 | |
| WO | WO00/32343 | 6/2000 | |

* cited by examiner

*Primary Examiner*—Geoffrey S. Evans
(74) *Attorney, Agent, or Firm*—McDermott, Will & Emery; Paul Devinsky

(57) ABSTRACT

A small hole electric discharge machine for forming a small hole in a workpiece by generating electric discharge between a rotating elongate pipe electrode (49) having a diameter of 1.0 mm or less and the workpiece. The small hole electric discharge machine may contain a column (11), a W-axis slider (21, 23) attached to the column so as to be moveable in the direction of a vertical W-axis, a Z-axis slider (31) attached to the W-axis slider so as to be moveable in the direction of a vertical Z-axis, a machine head (40) attached to the Z-axis slider the pipe electrode being attached to the machine head, a linear motor (90) for moving the Z-axis slider, and a gas spring (50) for generating a balance force to counteract the gravitational force acting on the Z-axis slider.

18 Claims, 5 Drawing Sheets

| Workpiece material: tungsten carbide-cobalt alloy<br>Diameter of copper pipe electrode: 0.1mm (outside diameter)<br>0.04mm (inside diameter) | | | | | | |
|---|---|---|---|---|---|---|
| | LN | | | MARK20 | | |
| Workpiece thickness (mm) | Time (min:s) | Electrode wear (%) | Diameter of machined hole (mm) | Time (min:s) | Electrode wear (%) | Diameter of machined hole (mm) |
| 1.26 | 0:55 | 220 | 0.1244 | 1:45 | 200 | 0.1243 |
| 2.26 | 1:50 | 270 | 0.1344 | 3:00 | 260 | 0.1314 |
| 5.04 | 7:35 | 295-385 | 0.1252 | 9:45 | 310-420 | 0.1376 |
| 7 | 16:45 | 360-495 | 0.1279 | Failed | | |

SMALL HOLE ELECTRIC DISCHARGE MACHINE

FIELD OF THE INVENTION

The present invention relates to a small hole electric discharge machine using an elongate pipe electrode having a diameter of 1.0 mm or less for forming a small and deep hole having a depth at least ten times larger than the diameter in a workpiece by generating electric discharge between the pipe electrode and the workpiece. Particularly, it relates to a small hole electric discharge machine for forming an ultrafine and deep hole using an elongate pipe electrode having a diameter of 0.1 mm or less.

BACKGROUND OF THE INVENTION

Small hole electric discharge machines typically utilize a copper, brass or tungsten elongate pipe electrode tool having a diameter of 1.0 mm or less to form a small hole, i.e., a hole, having a depth at least ten times larger than the diameter. Small hole electric discharge machines include a power supply device for applying a train of power pulses across a working gap formed between the lower end of the pipe electrode and the workpiece, and a fluid supply device for supplying a dielectric fluid, such as water of high resistivity or mineral oil, into the pipe electrode at high pressure. The upper end of the pipe electrode is held by an electrode holder, which is attached to a rotatable spindle in a machine head. The machine head is moveable in the direction of a vertical Z-axis by a Z-axis servo motor. An electrode guide is connected to a W-axis slider, which is moveable in the direction of a vertical W-axis, and is positioned close to the top surface of the workpiece.

During electric discharge machining, the pipe electrode, guided by the electrode guide, is moved gradually downward. By application of a train of power pulses, the insulation characteristics of the dielectric fluid in the work gap is broken down and electric discharges are generated. Microscopic amounts of the workpiece material are molten and blown out due to electric discharges, and are entrained in the dielectric fluid. Microscopic amounts of the pipe electrode material are also removed and become entrained in the dielectric fluid. The amount of wear on the pipe electrode tool is typically the same as or greater than the downward movement of the pipe electrode. The fine fragments removed from the workpiece and the pipe electrode are washed away from the work gap by dielectric fluid which flows through a dielectric fluid exit in the pipe electrode.

The working gap is maintained at a generally constant size. For this purpose, an NC device compares a mean gap voltage detected at the work gap to a reference servo-voltage, and controls the Z-axis servo motor based on the comparison result. In general, the pipe electrode is moved downward when mean gap voltage is higher than the reference servo-voltage, and the pipe electrode is moved, i.e., upward away from the bottom of the machined hole, when mean gap voltage is lower than the reference servo-voltage. Such servo movement may vary from a few $\mu$m to a few tens of $\mu$m.

A rotating device for rotating the pipe electrode at a few thousand rpm is provided on the machine head. Rotation of the pipe electrode improves roundness of the hole being formed in the workpiece and contributes to removal of the fine fragments from the work gap.

With a small hole electric discharge machine, a jump operation may be performed where an electrode tool is periodically reciprocated rapidly in the Z-axis direction to almost totally expel contaminated dielectric fluid from the hole in the workpiece. Unfortunately, such an operation may cause the elongate pipe electrode to become curved. Further, it is almost impossible to perform a jump operation at all with an elongate pipe electrode having a diameter of 0.1 mm or less. Also, the smaller the outer diameter of the pipe electrode used, the smaller the inner diameter becomes and a smaller quantity of dielectric fluid will be supplied to the work gap. For example, for a pipe electrode having an outer diameter of 0.30 mm, the diameter of the pipe electrode is normally 0.12 mm, 0.07 mm when the outer diameter is 0.15 mm, and 0.04 mm when the outer diameter is 0.1 mm. Thus, if a pipe electrode having a smaller outer diameter is used, electric power to be applied across the work gap will be limited to a relatively small value. The smaller electric power results a in smaller work gap which in turn makes it more difficult to remove fragments from the bottom of the hole being formed. Especially when a deeper hole is being formed in the workpiece, this makes it more difficult to remove fragments at the bottom of the hole.

If a large amount of fragments remain in the working gap, the working gap is likely to be frequently short circuited. When the NC device detects a short-circuit condition at the working gap, the pipe electrode is moved upward away from the machined hole and the power supply device is controlled to maintain an OFF time of power pulse for a sufficient time for a recovery from the short-circuit condition. Not only does the short-circuit current not contribute to the progress of electric discharge machining, it is moreover, likely to damage the pipe electrode. Short-circuit current may result in the pipe electrode being broken off. As such a broken piece is likely to be larger in size than the fine fragments produced by electric discharge machining, it is difficult to remove.

Moreover, if broken pieces accumulate at the bottom of the machined hole, they may cause a short-circuit of the working gap and even close off the opening at the lower end of the pipe electrode. Thus, as the formed hole becomes deeper, it becomes increasingly difficult to continue electric discharge machining.

Recently, it has become possible to form holes having a depth about 50 times larger than the diameter of a pipe electrode using pipe electrode having a diameter of 0.1 mm or less. However, it has been almost impossible to form holes having a depth more than about 50 times larger than the pipe electrode diameter when using a pipe electrode having a diameter of 0.1 mm or less.

DISCLOSURE OF THE INVENTION

An object of the present invention is to provide a small hole electric discharge machine which capable of forming a deeper hole in a workpiece when using an elongate fine pipe electrode having a diameter of even 0.1 mm or less.

Another object of the present invention is to provide a small hole electric discharge machine which can form a hole in the workpiece using an elongate fine pipe electrode having a diameter of 0.1 mm or even less at an improved machining rate.

According to the present invention, a small hole electric discharge machine for forming a small hole in a workpiece by generating electric discharge between a rotating elongate pipe electrode having a diameter of 1.0 mm or less and the workpiece may comprise:

a W-axis slider moveable in the direction of a vertical W-axis;

a Z-axis slider attached to the W-axis slider so as to be moveable in the direction of a vertical Z-axis;

a machine head attached to the Z-axis slider the pipe electrode being attached to the machine head;

a linear motor for moving the Z-axis slider; and a gas spring for generating a balance force to counteract the gravitational force acting on the Z-axis slider.

The linear motor improves the responsiveness of a machine head to decrease the frequency of short circuits at the work gap and to reduce damage on the pipe electrode due to such short circuits. The gas spring is a balancing device in order to maintain the improved responsiveness.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

DESCRIPTION OF THE PREFERRED EMBODIMENTS

Figure 1:
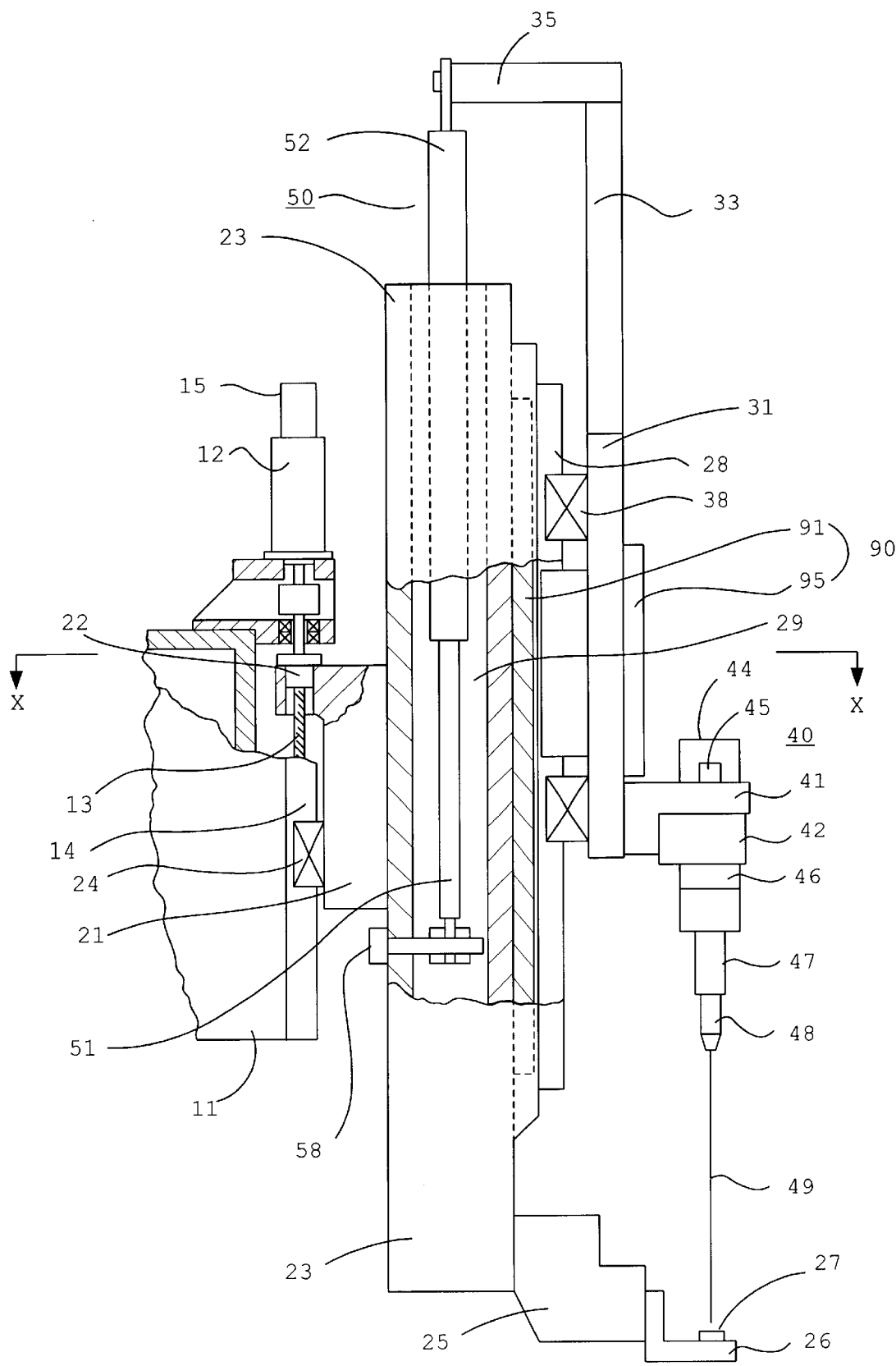
FIG. 1 is a side view, partly in section, illustrating a small hole electric discharge machine according to the present invention.

An embodiment of a small hole electric discharge machine according to the present invention will now be described with reference to FIG. 1, FIG. 2 and FIG. 3.

A pair of vertically extending rails 14 are attached to the front of a column 11. A pair of guides 24 are attached to the back of a W-axis slider 21 and engage the rails 14. A servo motor 12 for moving the W-axis slider 21 in the direction of a vertical W-axis is attached to the column 11. A nut 22 is attached to the back of the W-axis slider 21 and threadingly engages a rotation shaft 13 which is connected to the servo motor 12.

A hollow, rectangular W-axis slider body 23 is fixed to the front of the W-axis slider 21. The W-axis slider body 23 has an axially extending hole 29. The servo motor 12 is equipped with a rotary encoder 15 by which the position of the slider 21 or the slider body 23 is detected. A guide holder 26 is attached to the lower end of the slider body 23 by a connecting member 25. An electrode guide 27 is detachably held by the guide holder 26 and is positioned close to the top surface of the workpiece by controlling the servo motor 12. The electrode guide 27 has a guide hole through which a pipe electrode 49 can pass with a 2–5 $\mu$m clearance. A pair of vertically extending rails 28 are attached to the front of the slider body 23. A pair of guides 38 are attached to the back of a Z-axis slider 31 and engage the rails 28. The slider 31 is preferably made of material having a low specific gravity, for example, ceramics such as aluminum oxide ($Al_2O_3$), silicon nitride ($SiO_2$) and silicon carbide (SiC), light metal or carbon-fiber reinforced plastic. A permanent magnet type, linear synchronous motor 90 moves the Z-axis slider 31 in the direction of a vertical Z-axis. As the linear motor 90 does not require any transmission mechanism, i.e., such as a ball screw and a nut, it can move the Z-axis slider 31 with a high responsiveness. This high responsiveness decreases the frequency of a short circuit at the work gap and reduces potential damage to the pipe electrode due to short circuits. Therefore, the amount of the broken which pieces tend to accumulate on the bottom of the machined hole is decreased. A stator 91 and a mover 95 of the linear motor 90 are provided on the front of the slider body 23 and the back of the Z-axis slider 31, respectively.

Figure 2:
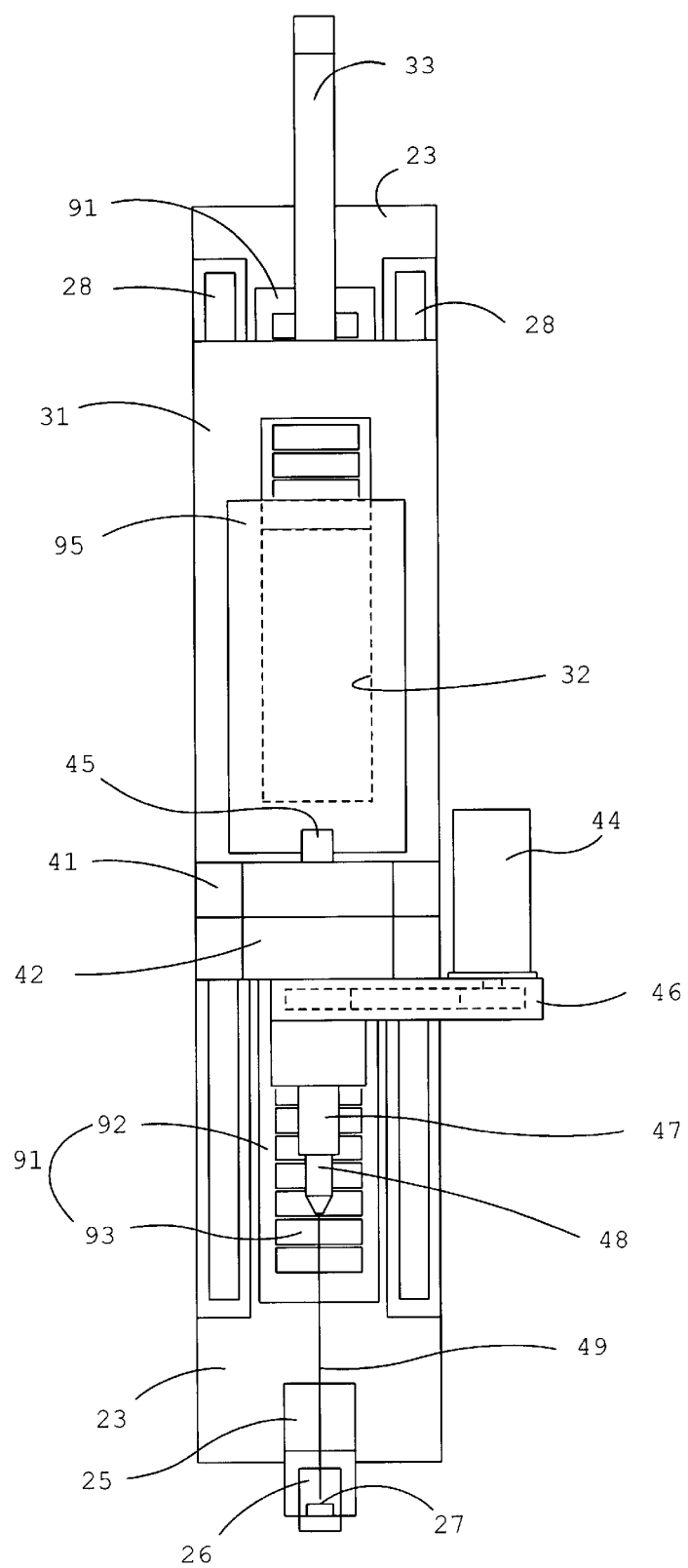
FIG. 2 is a front view of the small hole electric discharge machine of FIG. 1.

As best shown in FIG. 2, the linear motor stator 91 includes a yoke magnet plate 92 attached to the slider body 23 and a row of permanent magnets 93 arranged on the yoke magnet plate 92 in the direction of the Z-axis. The linear motor mover 95 is fixed into a window 32 formed in the Z-axis slider 31. The mover 95 may comprise a coil assembly and may include an armature core formed of laminated silicon steel sheets, and some excitation coils wound around the armature core.

Figure 3:
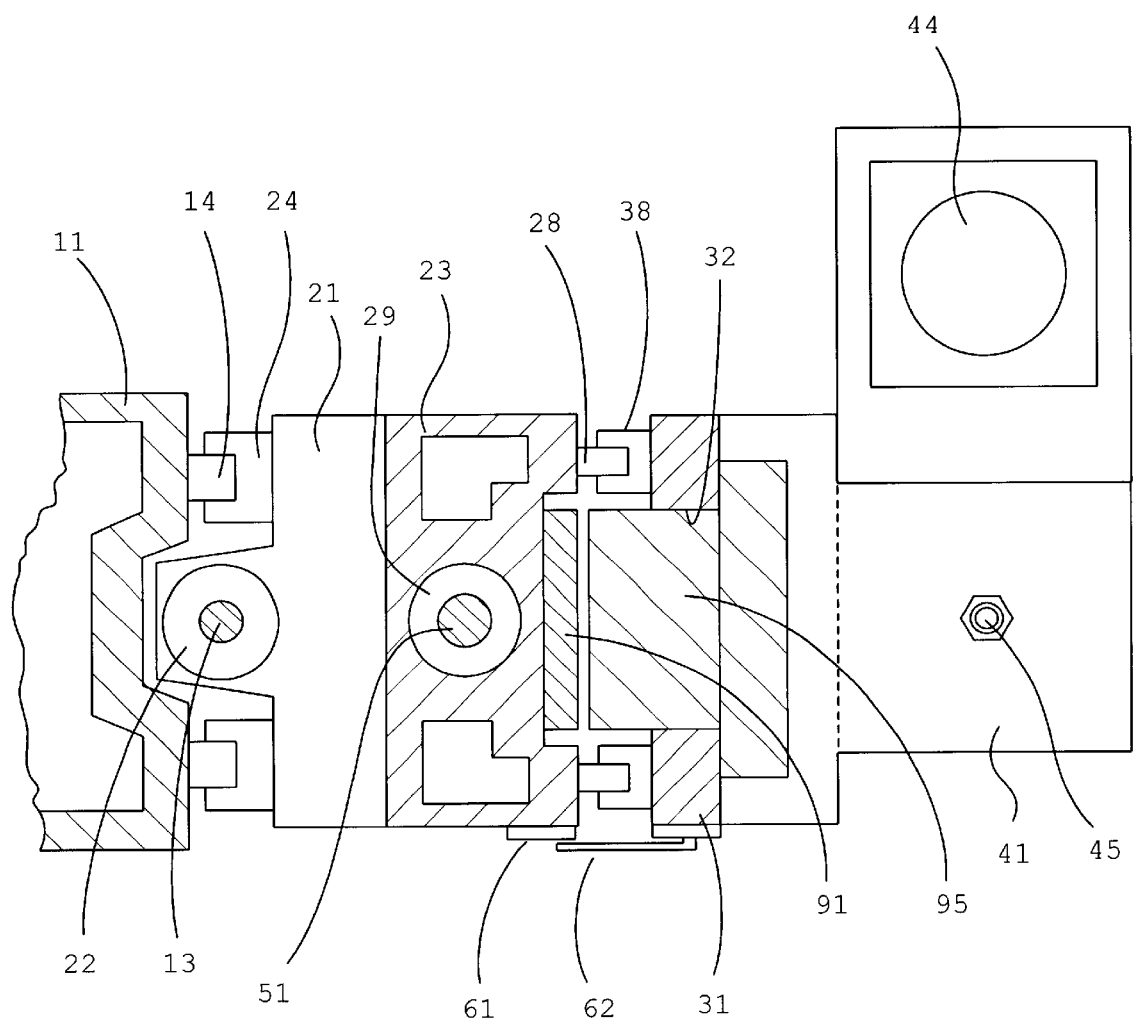
FIG. 3 is a cross sectional view of the small hole electric discharge machine of FIG. 1 taken along line X—X.

As shown in FIG. 3, the position of the Z-axis slider 31 in the Z-axis direction is detected by a linear scale 61 provided on the slider body 23 and a sensor 62 provided on the Z-axis slider 31, and fed back to a linear motor driver (not illustrated).

A head unit 40 (FIG. 1) having a rotating device is attached to the Z-axis slider 31. The head unit 40 includes a mount 41, a motor 44, an electrode holder 48, a spindle 47, a transmission mechanism 46 and an insulator 42. The mount 41 is preferably made of material having a lower specific gravity than the Z-axis slider 31 and is attached to the front of the lower end of the slider 31. The electrode holder 48, in which the elongate fine pipe electrode 49 is held, is attached to the lower end of the spindle 47. The motor 44 is provided for rotating the pipe electrode 49, and its rotational motion is transmitted to the spindle 47 by the transmission mechanism 46. The transmission mechanism 46 has a timing belt which is suspended across a pulley fitted to the spindle 47 and a pulley fitted to an output shaft of the motor 44. The spindle 47 is attached to the mount 41 by the insulator 42. During electric discharge machining, current is supplied to the pipe electrode 49 through the spindle 47 and the electrode holder 48 and dielectric fluid is supplied into the pipe electrode 49 at high pressure through an inlet 45 formed in the mount 41. An appropriate flexible hose can be connected to the inlet 45. The mount 41 is insulated from the spindle 47 by the insulator 42.

A gas spring 50 (FIG. 1) is provided in the axial hole 29 of the slider body 23. The lower end of a piston rod 51 of the gas spring 50 is fixed on the slider body 23 by a pin 58. A cylinder 52 of the gas spring 50 is connected to a vertically extending stem 33 by a connecting rod 35 which in the illustrated embodiment, extends horizontally. The lower end of the stem 33 is fixed to the upper end of the Z-axis slider 31. Thus, the Z-axis slider 31 is held by the gas spring 50.

A Z-axis moving unit which is moved by the linear motor 90 is preferably made and formed as light in weight as possible in order to decrease its inertial mass. The Z-axis moving unit includes the pipe electrode 49, the head unit 40, the Z-axis slider 31, the linear motor mover 95, the guides 38, the stem 33, the connecting rod 35 and the cylinder 52. As the gas spring 50 is a lightweight, compact counterbalancing unit, it does not adversely affect the high responsiveness.

Figure 4A:
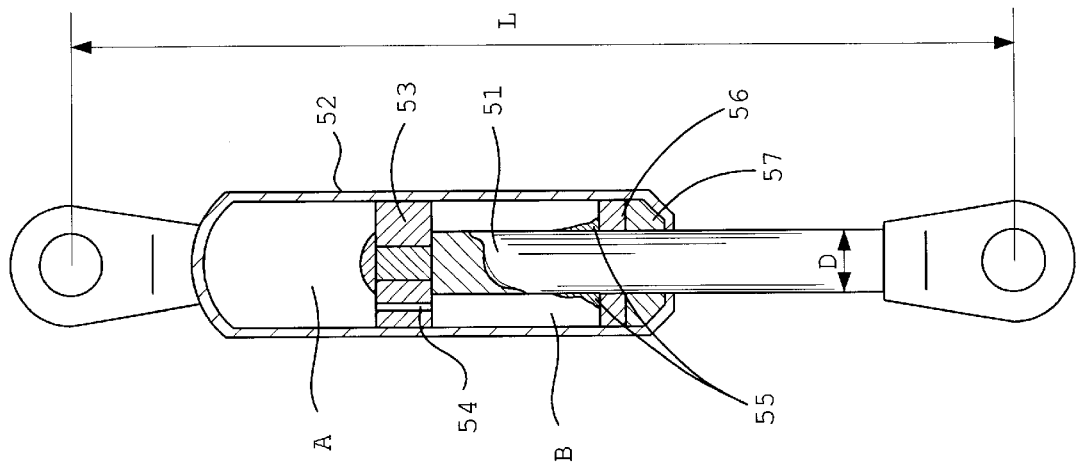
FIG. 4A is a cross sectional view illustrating the gas spring of FIG. 1.
Figure 4B:
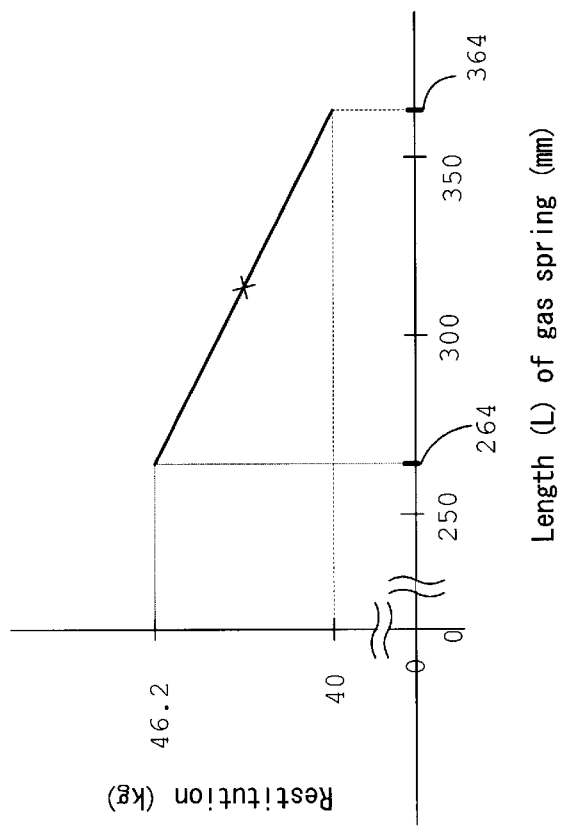
FIG. 4B is a graph of gaseous restitution as a function of a length of the gas spring of FIG. 4A.

An exemplary gas spring 50 will now be described in detail with reference to FIG. 4A and FIG. 4B. The exemplary gas spring 50 described above weighs about 260 g and the piston rod 51 may have a diameter (D) of, for example, about 10 mm. The piston rod 51 passes through a rod guide 57 which is provided on the lower end of the cylinder 52. The upper end of the piston rod 51 is fixed to a piston 53 which can reciprocate within the cylinder 52. The interior of the cylinder 52 is divided into an upper chamber A and a lower chamber B by the piston 53. High pressure nitrogen gas ($N_2$) and a little oil 55 are sealed into the chambers A and B. A small bore 54 is formed in the piston 53 to connect chambers A and B. A seal 56 is provided in the cylinder 52 to seal the gap between the cylinder 52 and the piston rod 51. As the top of the piston 53 is larger in pressure applied area than the bottom of the piston 53, the piston 53 is pushed downward. When the gas spring 50 expands and contracts by an external force, high pressure nitrogen gas moves from one chamber to the other chamber through the small bore 54. When the length of the gas spring 50 is shortened, the volume of chambers A and B is decreased and gaseous restitution, i.e., thrust of the gas spring 50, is increased, as shown in FIG. 4B. In the illustrated embodiment, the length (L) of the gas spring 50 changes between a maximum of about 364 mm and the minimum of about 264 mm according to the reciprocating motion of the piston 53. The gaseous restitution should be equal to the total weight (inertial mass) of the Z-axis moving unit when the length (L) of the gas spring 50 lies at a point halfway between the maximum and the minimum. This point is marked by the character X in FIG. 4B. Though the inertial mass of the Z-axis moving unit changes according to a diameter and the length of the pipe electrode 49, such a change is small and negligible in consideration of the thrust of the gas spring 50. Thus, wherever the Z-axis slider 31 is located in the Z-axis direction, the gas spring 50 can generate a balance force to counteract the gravitational force acting on the Z-axis slider 31 due to the inertial mass of the Z-axis moving unit.

Figures 5A, 5B:
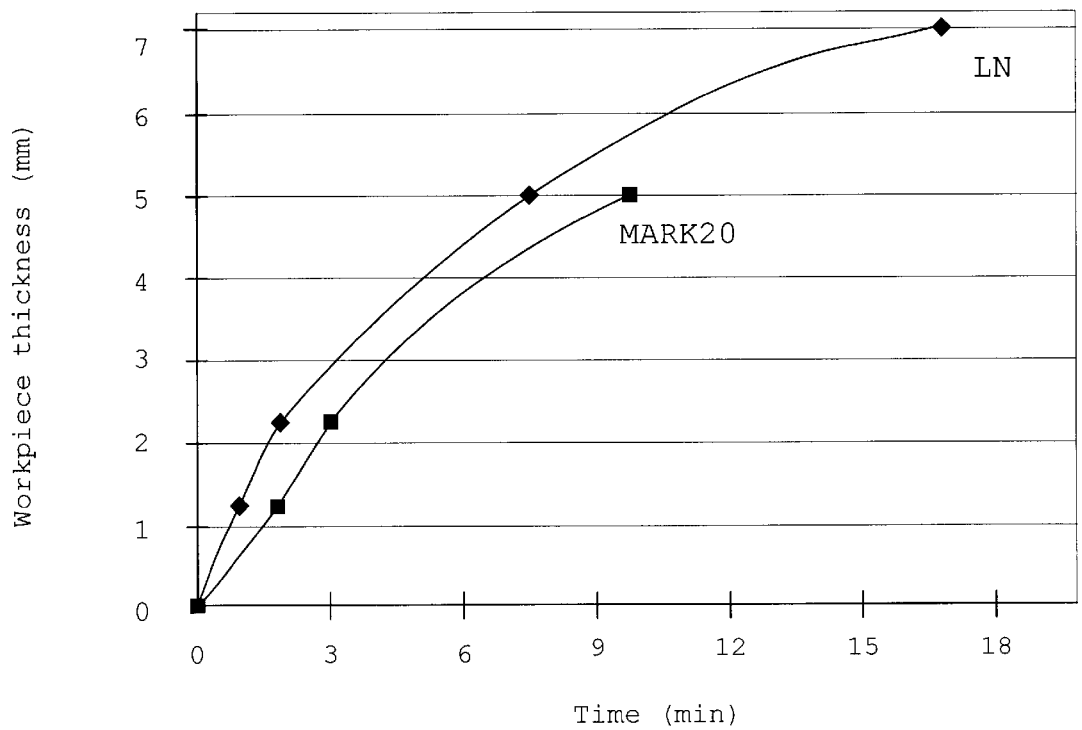
FIG. 5A is a table showing results of an experiment with the small hole electric discharge machine of FIG. 1.
FIG. 5B shows a plot of machining time as a function of workpiece thickness in FIG. 5A.

Through holes were formed in the tungsten carbide-cobalt alloy workpieces having thickness of 1.26 mm, 2.26 mm, 5.04 mm and 7 mm using the present invention and a conventional small hole electric discharge machines. A copper pipe electrode having an outer diameter of 0.1 mm, an inner diameter of 0.04 mm and a length of 150 mm was used. During electric discharge machining, the pipe electrode was rotated at a rotational speed of 2000 rpm and dielectric fluid was supplied into the pipe electrode at pressure of 8 MPa. The power pulse ON time was set to 4 $\mu$s, power pulse OFF time was set to 4 $\mu$s, the no load voltage set to 90V, the gap capacitance was set to 4700 PF, the servo reference-voltage set to 40V, and the mean current set to a maximum of 0.1 A. In the figures, a reference character LN denotes a small hole electric discharge machine according to the present invention and the reference MARK20 denotes a conventional small hole electric discharge machine. With the MARK20 machine, the Z-axis slider is driven by a rotary motor and a ball screw and the weight of the Z-axis moving unit is compensated by a counterweight instead of a gas spring. As shown in FIG. 5A and FIG. 5B, the LN machine improved machining speed regardless of the workpiece thickness though it undesirably increased wear ratio of electrode when the workpieces having thickness of 1.26 mm and 2.26 mm were machined. In addition, the LN machine succeeded in forming a through hole in the workpiece 7 mm thick while the MARK20 machine made no progress midway through the forming of a through hole in the same workpiece, wearing out the pipe electrode no matter how much it tried.

What is claimed is:

1. A small hole electric discharge machine for forming a small hole in a workpiece by generating electric discharge between a rotating elongate pipe electrode having a diameter of 1.0 mm or less and the workpiece, comprising:
   a W-axis slider moveable in the direction of a vertical W-axis;
   a Z-axis slider attached to the W-axis slider so as to be moveable in the direction of a vertical Z-axis;
   a machine head attached to the Z-axis slider, the pipe electrode being attached to the machine head;
   a linear motor for moving the Z-axis slider; and
   a gas spring for generating a balance force to counteract the gravitational force acting on the Z-axis slider.

2. The small hole electric discharge machine of claim 1, wherein the pipe electrode has a diameter of 0.1 mm or less.

3. The small hole electric discharge machine of claim 1, wherein the W-axis slider has an axial hole therein and the gas spring is provided in the axial hole.

4. The small hole electric discharge machine of claim 1, wherein the gas spring includes a piston rod fixed on the W-axis slider.

5. The small hole electric discharge machine of claim 1, wherein the gas spring includes a cylinder the upper end of which is connected to the Z-axis slider.

6. The small hole electric discharge machine of claim 5, wherein the gas spring includes a piston which divides the interior of the cylinder into an upper chamber and a lower chamber.

7. The small hole electric discharge machine of claim 6, wherein the gas spring includes a piston rod having an upper end which is connected to the piston and a lower end which is fixed on the W-axis slider.

8. The small hole electric discharge machine of claim 5, further comprising a stem vertically extending from the Z-axis slider and a horizontally extending rod which connects the stem and the cylinder.

9. The small hole electric discharge machine of claim 1, wherein the machine head has a rotating device for rotating the pipe electrode.

10. The small hole electric discharge machine of claim 1, further comprising an electrode guide for guiding the pipe electrode close to the top surface of the workpiece, and a guide holder connected to the W-axis slider for holding the electrode guide.

11. The small hole electric discharge machine of claim 1, wherein the linear motor includes a yoke magnet plate attached to the W-axis slider and a row of permanent magnets arranged on the yoke magnet plate.

12. The small hole electric discharge machine of claim 1, wherein a window is formed in the Z-axis slider and the linear motor includes a coil assembly fixed into the window.

13. A small hole electric discharge machine for forming a small hole in a workpiece by generating electric discharge between a rotating elongate pipe electrode having a diameter of 1.0 mm or less and the workpiece, comprising:
   a W-axis slider moveable in the direction of a vertical W-axis;
   an electrode guide having a guide hole through which the pipe electrode can pass, for guiding the pipe electrode close to the top surface of the workpiece;
   a guide holder connected to the W-axis slider for holding the electrode guide;
   a Z-axis slider attached to the W-axis slider so as to be moveable in the direction of a vertical Z-axis;
   a mount attached to the Z-axis slider;

a spindle attached to the mount;

an electrode holder attached to the spindle for holding the upper end of the pipe electrode;

a motor for rotating the spindle; and a linear motor having a stator attached to the W-axis slider and a mover attached to the Z-axis slider, for moving the Z-axis slider.

14. The small hole electric discharge machine of claim 13, wherein the pipe electrode has a diameter of 0.1 mm or less.

15. The small hole electric discharge machine of claim 13, further comprising a gas spring for generating a balance force to counteract the gravitational force acting on the Z-axis slider.

16. The small hole electric discharge machine of claim 15, wherein the W-axis slider has an axial hole therein and the gas spring is provided in the axial hole.

17. The small hole electric discharge machine of claim 13, wherein the stator of the linear motor includes a yoke magnet plate attached to the W-axis slider and a row of permanent magnets arranged on the yoke magnet plate.

18. The small hole electric discharge machine of claim 13, wherein a window is formed in the Z-axis slider and the mover of the linear motor includes a coil assembly fixed into the window.

* * * * *